United States Patent
Uebelein et al.

(10) Patent No.: US 6,236,176 B1
(45) Date of Patent: May 22, 2001

(54) METHOD FOR ELECTRONIC CONTROL AND ADJUSTMENT OF THE MOVEMENT OF ELECTRICALLY ACTUATED UNITS

(75) Inventors: Jörg Uebelein, Grub am Forst; Roland Kalb, Rossach; Jürgen Seeberger, Baunach, all of (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/367,398

(22) PCT Filed: Mar. 10, 1998

(86) PCT No.: PCT/DE98/00757

§ 371 Date: Aug. 12, 1999

§ 102(e) Date: Aug. 12, 1999

(87) PCT Pub. No.: WO98/40945

PCT Pub. Date: Sep. 17, 1998

(30) Foreign Application Priority Data

Mar. 12, 1997 (DE) .............................................. 197 11 979

(51) Int. Cl.⁷ ...................................................... H02P 7/00
(52) U.S. Cl. .......................... 318/287; 318/280; 318/434; 318/461; 318/469
(58) Field of Search ................................... 318/287, 434, 318/469, 461, 465

(56) References Cited

U.S. PATENT DOCUMENTS

| | | | |
|---|---|---|---|
| 4,468,596 | 8/1984 | Kinzl et al. | 318/287 |
| 4,571,884 | 2/1986 | Hetmann et al. | 49/72 |
| 4,641,067 | * 2/1987 | Iizawa et al. | 318/287 |
| 4,686,598 | 8/1987 | Herr | 361/31 |
| 4,746,845 | * 5/1988 | Mizuta et al. | 318/286 |
| 5,170,108 | 12/1992 | Peterson et al. | 318/469 |
| 5,268,623 | 12/1993 | Muller | 318/434 |
| 5,331,367 | 7/1994 | Kawasaki et al. | 354/412 |
| 5,334,876 | * 8/1994 | Washeleski et al. | 307/10.1 |
| 5,399,950 | 3/1995 | Lu et al. | 318/565 |
| 5,410,229 | 4/1995 | Sebastian et al. | 318/434 |
| 5,422,551 | 6/1995 | Takeda et al. | 318/265 |
| 5,483,135 | 1/1996 | Parks | 318/469 |
| 5,521,474 | 5/1996 | Hahn | 318/285 |
| 5,530,329 | 6/1996 | Shigematsu et al. | 318/469 |

(List continued on next page.)

FOREIGN PATENT DOCUMENTS

| | | |
|---|---|---|
| 30 34 118 | 3/1982 | (DE) . |
| 33 01 071 A1 | 7/1984 | (DE) . |
| 33 46 366 | 7/1985 | (DE) . |
| 35 32 078 | 4/1986 | (DE) . |
| 35 14 223 | 10/1986 | (DE) . |
| 42 14 998 | 11/1993 | (DE) . |
| 43 16 898 | 12/1993 | (DE) . |
| 195 11 581 | 10/1995 | (DE) . |
| 44 11 300 | 10/1995 | (DE) . |
| 195 17 958 | 11/1995 | (DE) . |

(List continued on next page.)

Primary Examiner—Robert E. Nappi
Assistant Examiner—Rita Leykin
(74) Attorney, Agent, or Firm—Christie, Parker & Hale, LLP

(57) ABSTRACT

There is a method for controlling the movement of electrically operated assemblies, more particularly of window lifters, sliding roofs or the like in motor vehicles. The assembly has a setting device is connected to a drive device. At least in one partial area of the displacement path, the displacement force is restricted to a predetermined maximum value. A parameter is proportional to the displacement force of the electrically operated assembly. Upon reaching a boundary value corresponding to the maximum value of the displacement force over a predetermined time span, the parameter is regulated to a value corresponding to this boundary value.

22 Claims, 5 Drawing Sheets

U.S. PATENT DOCUMENTS

| | | | |
|---|---|---|---|
| 5,539,290 | 7/1996 | Lu et al. | 318/565 |
| 5,596,253 | 1/1997 | Mizuta et al. | 318/469 |
| 5,640,072 | 6/1997 | Miyazaki et al. | 318/282 |
| 5,682,090 | 10/1997 | Shigematsu et al. | 318/468 |
| 5,740,630 | 4/1998 | Medebach | 49/352 |
| 5,872,436 | 2/1999 | Bergmann et al. | 318/286 |

FOREIGN PATENT DOCUMENTS

| | | |
|---|---|---|
| 195 14 954 A1 | 12/1995 | (DE). |
| 195 36 207 A1 | 4/1996 | (DE). |
| 195 07 137 | 9/1996 | (DE). |
| 0 047 812 | 3/1982 | (EP). |
| 0 331 142 A2 | 9/1989 | (EP). |
| 0 270 837 A1 | 6/1998 | (EP). |
| 59-045515 | 3/1984 | (JP). |
| 63-101912 | 5/1988 | (JP). |
| 4-126629 | 4/1992 | (JP). |
| 5-254347 | 10/1993 | (JP). |
| WO 97/12108 | 4/1997 | (WO). |

* cited by examiner

METHOD FOR ELECTRONIC CONTROL AND ADJUSTMENT OF THE MOVEMENT OF ELECTRICALLY ACTUATED UNITS

FIELD OF THE INVENTION

The invention relates to a method for controlling and regulating the movement of electrically operated assemblies, more particularly window lifters, sun roofs or the like in motor vehicles.

BACKGROUND OF THE INVENTION

From DE 30 34 118 A1 a method is known for electronically operating and monitoring the opening and closing cycle of electrically operated assemblies, such as window lifters and electric sun roofs in motor vehicles. The path covered during opening of the assembly is electronically captured. During closing of the assembly, the captured opening path is compared electronically with the closing path which has been covered. The opening and closing path of the assembly is, for this purpose, divided up into three areas of which the first area runs from half opened to fully opened, the second area runs from half opened to practically fully closed and the third area runs from practically fully closed to completely closed.

In the first and third areas, the blocked state, which represents the fully opened and fully closed assembly, is detected and a setting member of the assembly is switched off. In the second area, the speed of a servo drive of the assembly is detected and, in the event of a reduction in the speed, the servo drive is switched off.

With this known method for producing a so-called "anti-jam protection," the servo drive is designed with regard to its power so that the mechanical resistances which are conditioned by the type of assembly and through outside influences are overcome over the entire displacement area. For this reason, the servo drive is designed with its power output significantly greater than is necessary for most of the displacement range. This in turn has the result that a part of the body present in the displacement area is jammed with a very high force by the assembly part which is being displaced.

A further drawback with this known method is that in the third area, that is as the window pane or sliding roof enters into the seal area for completely closing the window or roof, only the blocking state and not, however, an anti-jam state is detected.

From DE 195 07 137 A1, a method is known for monitoring and controlling the opening and closing process of electrically operated assemblies provided in motor vehicles. The power of the servo motor is controlled so that the displacement speed of the setting member is adjustable over its displacement path, in dependence on predetermined positions of the assembly. In this way, the force exerted in the jamming state by the assembly part, which is to be displaced, is to be restricted to a minimum over critical areas of the displacement path, so that the critical area is covered more slowly and thus more sensitively.

This method does indeed allow a "soft inlet" into the seal area, that is a slow displacement speed of the assembly part being displaced in the area of the seal inlet, in order to meet the requirements which are specific to individual countries with regard to an effective anti-jam protection. The slow inlet of the assembly part being displaced into the seal area, however, makes it difficult to almost impossible to recognize a standardized 4 mm round tube to determine the efficiency of the anti-jam protection and to safely distinguish the influences of the displacement forces in the sealing area. This is particularly true in the case of frameless doors and doors with panes on the outside. Furthermore, the known method leads to faulty releases of the anti-jam protection with subsequent reversing of the assembly being displaced during entry into the seal. Furthermore, the closing time of the window is increased.

From DE 35 32 078 C2, a control method is known for controlling the drive of windows or doors with an electric motor. A drive current is measured during the closing movement and the change in power is checked at constant time intervals by setting a current change boundary value. To this end, a minimum current value is predetermined inside a constant period, to which is added a fixed amount and the total sum is set or laid down as the reference value for detecting an abnormal motor load. If this boundary value is exceeded, then the closing movement is switched over to an opening movement.

The drawback with this known control method is that likewise temporary disturbances during a closing movement, which are traced back to external influences or temporary heavy going (operational difficulties) of the system, but without a jamming state existing, are substantially not recognized and lead to an opening movement although the closing movement could be continued.

From DE 41 12 998 A1, a method is known for controlling a gate drive which has a setting device, a drive device connected with the setting device, as well as a control and evaluator electronics for evaluating measuring signals and for producing control commands. To displace a gate operated by means of the gate drive, a displacement force is applied the amount of which is selected in dependence on the displacement path.

Should the displacement force exceed a predetermined safety limit, then the drive device is switched off or the drive device is reversed. This safety limit is formed by the sum of the displacement force dependent on the displacement path and a constant additional force. In this way, it is possible to compensate for interference by environmental or seasonal factors, without resulting in a premature safety cut-off.

With this known method, interference through environmental or seasonal factors are indeed taken into consideration, but the drive device is switched off every time the safety limit is exceeded. Also, here only a temporary disruption, during a closing movement which is due to outside influences or temporary difficulties in the system without a jamming case existing, is not recognized. This leads to a cut-off or reversion, although the closing movement could be continued.

SUMMARY OF THE INVENTION

The object of the invention is to provide a method of the kind already mentioned wherein over the entire displacement area of a setting device, an anti-jam protection is guaranteed. The anti-jam protection satisfies even the most stringent safety requirements, but rules out, as far as possible, a faulty reversing or stopping of the setting device based on external influences, variable resistances or too little displacement force in the displacement area.

The solution according to the invention ensures, over the entire displacement area of the setting device, an anti-jam protection which satisfies the most stringent of safety requirements. At the same time, the anti-jam protection ensures that the setting device opens or closes an electrically operated assembly with sufficient displacement force independently of external influences and variable resistances in the displacement area, at the discretion of the operator.

Substantially eliminating external influences and different resistances in the displacement area ensures that even when the electrically operated assembly is stationary, despite a predetermined closing impulse, a regulated closing process takes place over a predetermined time interval. In this additional time interval, however, the predetermined maximum value of the displacement force is not exceeded until either further movement of the electrically operated assembly takes place, or in the event of a continued stationary state of the electrically operated assembly, a drive device is switched off.

Parameters proportional to the displacement force of the electrically operated assembly are, for example, the current taken up by the drive device of the electrically operated assembly or the torque delivered by the drive device. Parameters correlated with the dynamics of the setting device of the electrically operated assembly are, for example, the speed or acceleration of the displacement device or assembly.

The excess force restriction can be restricted to a partial area of the displacement path, since, for example, the jamming of larger parts of the body need not be considered when opening the electrically operated assembly and in the area adjoining the completely opened state of the assembly.

From U.S. Pat. No. 5,410,229, a circuit arrangement for controlling the speed of an electric motor is known wherein the motor is stopped on reaching a predetermined counter torque. For this purpose, the motor current is controlled in pulse width modulation in dependence on the captured speed of the electric motor and a predetermined maximum torque.

However, with this electronic coupling, the motor current is constantly interrupted when the predetermined maximum torque is reached, so that when used for an electrically operated assembly in motor vehicles, a closing movement would be interrupted. For example, if as a result of external influences the counter torque reaches a corresponding value, a window pane could not be completely closed. On the other hand, with a correspondingly high value of the permissible counter torque, an inadmissible jamming force would act on a part of the body located in the displacement area of the electrically operated assembly, so that the known control circuit would be unsuitable for the present case.

In DE 196 15 581 A1, which has an earlier priority, a method is described for controlling electrical drives in motor vehicles with an electric motor whose controlled operation is provided by a torque/speed characteristic line and wherein the active torque is monitored. With a boundary torque which is greater than the torque normally occurring and clearly lower than the maximum torque the drive is regulated to an approximately constant torque.

With this method, first a boundary torque is fixed, that is a static boundary value is predetermined for the boundary torque. Compared to this, the present invention claims the provision of a dynamic boundary value which takes into account, by way of adaptation, a slight excess force. The dynamic boundary value is changeable with each opening or closing process, so that to produce an anti-jam protection, a small clamping force of any size is guaranteed without the drive device undesirably coming to a standstill as a result of too little displacement force in dependence on the displacement path.

The parameter proportional with the displacement force is preferably regulated upon reaching a predetermined boundary value dependent on the displacement position (envelope curve b). The predetermined boundary value corresponds to the maximum excess force permissible at the relevant displacement position.

The boundary value regulation of the parameter proportional with the displacement force takes place within the predetermined time span until either the parameter understeps (or falls below) the predetermined boundary again, or either the setting device or the drive device has come to a standstill. The position-dependent regulation of the excess force thereby takes into account the normal displacement force required for displacing the assembly. As a result, with a corresponding restriction of the excess force, even in the most unfavorable case, a jamming state always remains in the harmless area.

The interruption of the current delivered to the drive device and/or reversing the rotary direction of the drive device is preferably delayed by a time interval $\Delta t0$. The drive device sends out a constant torque to the setting device during the duration of the delay.

The time interval $\Delta t0$ is preferably measured so that a satisfactory differentiation can be made between a jamming case and an external, temporary (dynamic) fault.

A further advantageous development of the solution according to the invention is characterized in that the boundary value of the parameter is increased by a predetermined amount when the setting device or the drive device has come to a standstill and a control impulse is delivered within the predetermined time span by an operating device, which causes the electrically operated assembly to be closed.

This development of the solution according to the invention provides an increase in the drive power in the event that, during the time duration of the boundary value regulation within the predetermined time interval, an increased ideal value is produced when the operating person, despite a standstill of the electrically operated assembly, creates a switch impulse controlling the closing movement, i.e. wants to carry out a closing of the electrically operated assembly.

An advantageous development of the solution according to the invention is characterized in that the parameter corresponds to the current supplied to an electric motor as the drive device, so that the current collection of the electric motor is restricted to a value which corresponds to a maximum resulting excess force.

Restricting the current collection of the electric motor to a value which corresponds to a maximum resulting excess force can take place in that the maximum value of the current delivered to the electric motor is set at a value corresponding to the maximum resulting excess force or in the event of a pulse width modulation of the current delivered to the electric motor, the peak value (maximum value), the arithmetic mean value or quadratic mean value (effective value) of the current is set to a value corresponding to the maximum resulting excess force. In another alternative, the maximum value, the arithmetic mean value or the quadratic mean value of the current is predetermined depending on the position of the setting device.

Restricting the current collection of the electric motor to a value corresponding to the maximum resulting excess force ensures that the setting device carries out the desired displacement movement without the force, which extends beyond the required displacement force, being able to represent a danger for parts of the body present in the displacement area in the event of jamming.

From U.S. Pat. No. 5,268,623, a circuit arrangement is known for controlling a direct current motor with a current restricting device which governs the direct current motor with current blocks with varying pulse duration/pulse pause ratio. In the event of a blocking of the direct current motor, the pulse duration/pulse pause ratio is reduced so that neither the motor overheats nor does the starting current, at the start-up of the direct current motor, adopt too high a value.

With this known control method, when the direct current motor is blocked, the current supply to the motor is not interrupted. The arithmetic mean value of the current supplied to the direct current motor in the pulse width modulation is always reduced to a value which is harmless for the direct current motor when a blocked state occurs, that is any counter torque detected as a blocked state leads to a reduction of the motor torque to a fixed value. In the present case, in relation to the window entering into the seal area with increased resistance detected as a blocked state, no complete closing of the window pane would result.

Compared to this, however, the method according to the invention guarantees the implementation of the desired displacement path that depends on different resistances or counter torques appearing in the displacement path, because there is always an excess force. The excess force is a force which exceeds the force required for the displacement movement by a predetermined amount. The amount of the excess force can thereby remain constant over the entire displacement path, when the drive force required for the displacement movement is adapted to the displacement resistances over the displacement path. This excess force is measured so that it satisfies at any location in the displacement path the most stringent anti-jam protection requirements so that, even in critical areas, both the completion of the desired displacement movement and an effective anti-jam protection are guaranteed.

The displacement force and/or the excess force can, according to a feature of the method according to the invention, be predetermined in dependence on the motor voltage, the motor speed, and/or the motor temperature or the surrounding temperature. The detection of these values makes it possible to take into account outside or system-imminent influences when implementing a displacement movement by taking into account both the anti-jam protection and also a safe implementation of the displacement movement.

The electric motor is preferably classified at a testing station with regard to at least a characteristic feature (e.g. rise or slope in the motor characteristic line). The at least one characteristic feature is used to calculate an envelope curve restricting the excess force.

A particularly advantageous development of the method according to the invention is characterized in that the motor characteristic line of the electric motor is recorded over the displacement path of the setting device and is stored. An amount of the current corresponding to the maximum resulting excess force is added to the motor current of the motor characteristic line corresponding to the relevant motor torque at that time. The current delivered to the electric motor is restricted over the at least one partial area of the displacement path to this resulting maximum value of the current.

The restriction of the maximum motor torque and thus the restriction of the maximum excess force of the electrically operated assembly can take place, according to this method feature, by a position-dependent fixing of the maximum value of the current supply to the electric motor. The position-dependent maximum value is determined in a defined "measuring stroke." To this end, the normal curve for the current collection is determined through the implementation of a complete displacement movement in a standardizing run. The relevant maximum value of the current collection or current supply to the electric motor is determined by taking into account the restricted excess force through an envelope curve which is calculated by including the various influencing factors.

To these influencing factors belong, for example, the voltage, the speed, the preliminary resistance, the motor and surrounding temperature as well as the specific motor characteristic line which is inherent to each electric motor and which can undergo considerable fluctuations. This motor characteristic line can, where applicable, be individually determined at a motor testing station in production so that fixing the maximum motor current with a sufficient restricted excess force, taking into account an active antijam protection, can be adapted individually to each relevant electric motor.

The resulting or maximum excess force can be adapted selectively, also adaptively, to the different resistances in the displacement area throughout the service life. The current collection of the electric motor is detected over the displacement area and is stored as a value pair with the relevant position of the displacement device. In this way, it is possible to detect areas of heavy going in the lift area and/or heavy going in the area of an inlet into the seal and thus to fix, adaptively, the displacement force required for the displacement movement and the resulting excess force.

A further advantageous development of the solution is characterized in that the envelope curve restricting the excess force is set high when the speed of the electrically operated assembly, after reaching the predetermined boundary value, is not reduced by the parameter, or the negative acceleration does not exceed a boundary value. Raising the envelope curve can thereby take place by a predetermined amount or until the speed of the electrically operated assembly has reached a certain value.

This further development of the solution according to the invention takes into consideration that, as a result of external influences or system-conditioned resistances in the displacement area, the parameter which is proportional to the displacement force does indeed reach the predetermined boundary value. However, either the speed of the electrically operated assembly is not reduced or the braking of the system caused by the resistances does not extend beyond a certain amount. This leads to a reduction of the boundary value in order to take into account this heavy going caused by the external influences or additional resistances in the displacement area.

Through the position-related detection of delays (heavy going) of the electrically operated assembly and storage of the detected values, it is possible to change the path of the envelope curve adaptively.

A further development of the solution according to the invention is characterized in that, upon reaching the predetermined maximum value, the arithmetic mean value or the effective value of the current collected by the electric motor, the current delivered to the electric motor is interrupted and/or the rotary direction of the electric motor is reversed.

If, according to this feature of the method according to the invention, the motor current reaches the fixed or calculated maximum value, the motor current is restricted and kept constant. This development of the solution according to the invention always proves expedient when a reliable differentiation between areas of heavy going action, for example, when entering into the seal, and a jammed state is not possible. Since the excess force, in the case of a restricted current which is kept constant is, however, always less than a predetermined boundary value, the risk of a part of the body becoming jammed does not arise even in the most unfavorable cases.

According to a further development of the method according to the invention, after reaching the fixed or calculated maximum value of the motor current, an immediate or time-delayed reversal of the displacement device can take place. In particular, the time-delayed reverse serves to screen out dynamic disruptions which appear, for example, as a result of short-term negative accelerations through potholes or short-term disturbances in the event of a lifting movement of the electrically operated assembly.

A constant torque is preferably delivered to the displacement device during the deceleration of the displacement motor.

According to a further feature of the method according to the invention, the rise in the motor torque can be delayed so that the excess force of the electrically operated assembly only rises slowly. A restriction of the motor current rise (di/dt) connected therewith can preferably be produced through a corresponding switch element, such as a rhythmic semi-conductor, a controllable resistance or the like.

A pulse width control of the motor current, by means of a semiconductor switch allows the fixed or calculated maximum value of the motor current to be adapted over the entire displacement area of the electrically operated assembly in the shortest possible time and thus in small position-change steps. A circuit arrangement of this kind furthermore ensures a simple construction or a simple programming of the control electronics taking into account the most varied of influencing factors, which can be additionally detected or taken into account within the framework of an adaptive control.

Since the same current flows through the semiconductor switch as through the servo motor, it is also possible to achieve a simple overheating protection for the displacement motor, particularly as many known power semiconductor switches detect the actual operating temperature in order to prevent a thermal breakdown of the semiconductor switch. A semiconductor switch without temperature detection, can be coupled thermally, for example, to a temperature-dependent resistor or the like, in order to switch offset semiconductor switch upon reaching a critical temperature and thus to interrupt the further supply of current to the displacement motor.

Instead of measuring current to regulate the scanning ratio of the pulse width modulation, the scanning ratio can be calculated from the idling speed, the actual speed and the motor characteristic line of the electric motor, and thus a device for detecting the motor current can be spared.

BRIEF DESCRIPTION OF THE DRAWINGS

The idea underlying the invention will now be explained in further detail with reference to the embodiment shown in the drawings in which.

DETAILED DESCRIPTION OF THE PREFERRED EMBODIMENT

Figure 1:
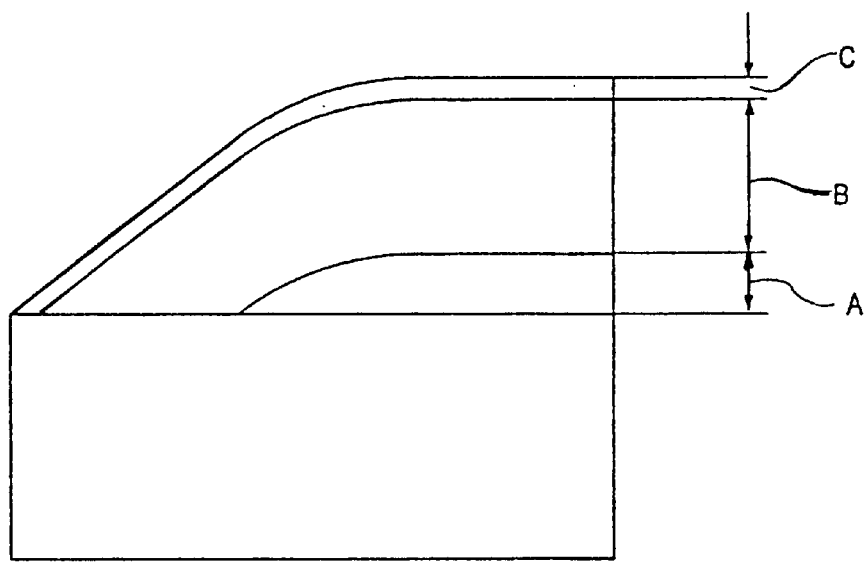
FIG. 1 shows a diagrammatic view of various displacement areas in a window lifter system.

The displacement areas shown in FIG. 1 are covered by a window pane during opening and closing of the window pane in the door of a motor vehicle. The displacement areas can basically be divided into three areas, Area A reaches from the fully opened window pane to a window pane closed by a third. Area B extends from the window pane closed by a third up to shortly before the window pane enters the window seal. Area C extends over the sealing area.

For an anti-jam protection there are basically two areas B and C which are relevant during closing of the window, while in area A, as a result of the large distance between the upper edge of the window pane and the door frame, the jamming of larger parts of the body can be ruled out. However, area A can also be included in the monitoring and control for an anti-jam protection.

In the area part B when a jamming state exists, it must be ensured that the force acting on the jammed object or the jammed part of the body must not exceed a certain predetermined amount and the lifting and lowering of the window must be guaranteed against motion resistances of the window lifter system, and where applicable, external influences. In the area part C, special conditions apply since here, as a result of the increased resistance when the window pane runs into the seal, on the one hand a secure closing of the window pane must be ensured, and on the other for safety reasons a 4 mm bar must be recognized and reliably distinguished from the influences of the displacement forces in the sealing area.

When establishing the displacement forces required for opening and closing, for example, a window lifter system in addition to external influences such as surrounding temperature, resistances when traveling over the displacement path, temperature of the displacement motor, etc., of particular importance is the motor characteristic line of the displacement motor whose characteristic line is subject to considerable specimen variations.

Figure 2:
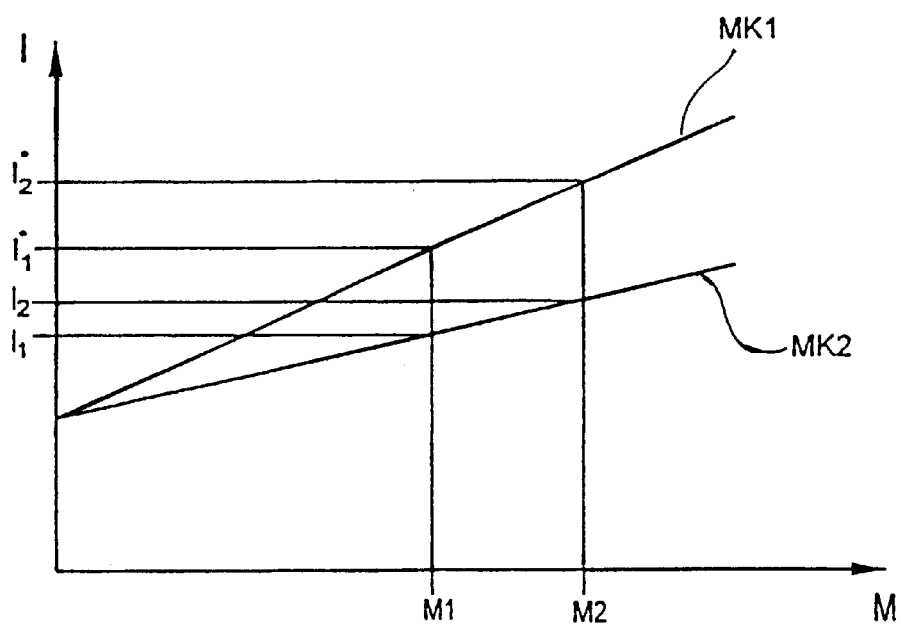
FIG. 2 shows a graphic representation of two different motor characteristic lines.

FIG. 2 shows, by way of a diagrammatic example, the motor characteristic line of two different electric motors which collect up different motor currents to reach a matching motor torque M. For a position-dependent "normal" torque $M_1$, the one electric motor with the motor characteristic line $MK_1$ requires a position-dependent "normal" lift current $I^*_1$. Where applicable, the "normal" lift current is balanced by the influencing factors. Another electric motor with the motor characteristic line $MK_2$ requires a position-dependent lift current $I_1$.

In the event of a maximum permissible torque $M_2$, the one electric motor with the motor characteristic line $MK_1$ requires a maximum permissible current $I^*_2$. The other electric motor with the motor characteristic line $MK_2$ collects a maximum permissible current of $I_2$. Dependent on the relevant motor characteristic line of the electric motor used, according to the subject of the present invention, the excess force which is produced from the difference between the maximum permissible torque and the position-dependent normal torque is reduced to a predetermined value, which must not be exceeded anywhere in the displacement path.

Upon reaching the set or calculated maximum current value which corresponds to the relevant maximum permissible torque or the maximum permissible displacement force, the current collection of the electric motor is restricted by a corresponding switch element, whereby the maximum motor torque and thus the maximum excess force of the window lifter system shown in this embodiment is restricted.

Figure 3:
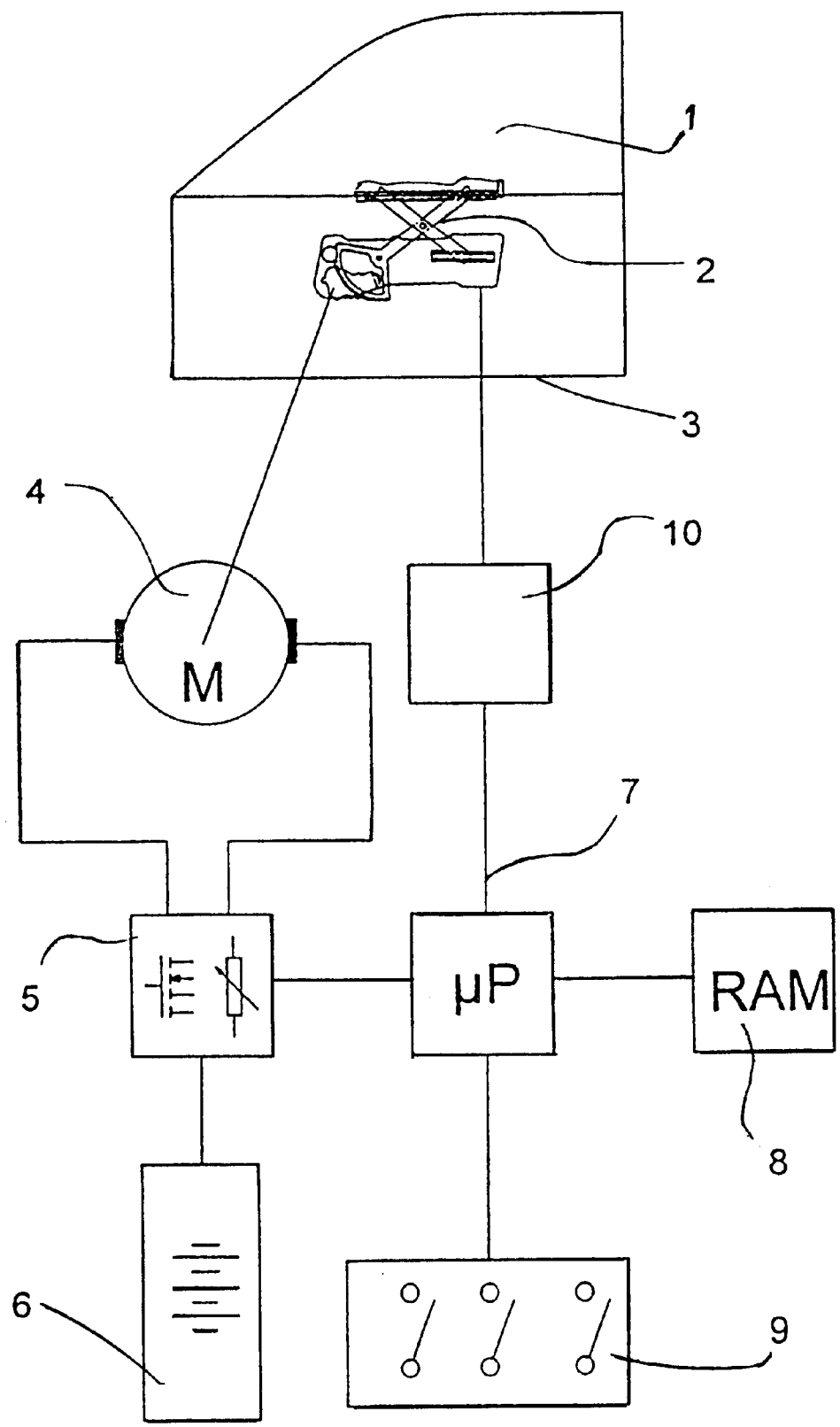
FIG. 3 shows a diagrammatic illustration of a circuit arrangement for controlling a window lifter system.

FIG. 3 shows, in a block circuit diagram, a circuit arrangement for implementing the method according to the invention in the case of a window lifter displacement system as the electrically operated assembly for displacing a window pane 1 by means of a setting device 2 in the opening area of a motor vehicle door 3. The setting device 2 is driven by an electric motor 4 in two directions of movement. The electric motor is fed through a switch device 5 from a voltage source 6 wherein, in the illustrated embodiment, the current direction through the electric motor 4 can be changed by reversing the poles of the voltage source 6 through the switch device 5. For example, by arranging semi-conductor elements in the bridge circuit and by arranging corresponding control of the semiconductor elements lying in a bridge branch, the direction through the electric motor is changed.

The switching device 5 can consist of any semiconductor switch elements such as transistors (MOSFETs), thyristors as well as controllable resistors. The control of the switch device takes place through a control and regulating electronics device 7, which preferably consists of a micro processor which is connected to a random accessory memory 8. The micro processor is additionally connected to an operating element 9 as well as, where applicable, to a sensor device 10 which comprises sensors connected to parts of the displacement system. The sensor device detects other external influences, and can, where applicable, detect and monitor the supply voltage.

The control and regulating electronics device 7 controls the switch device 5 in a way where the motor current is pulse-width-modulated in one or both flow directions so that the arithmetic mean value or the quadratic mean value (effective value) of the motor current can be infinitely varied.

The control signals are delivered by the control and regulating electronics device 7 to the switch device 5. The control signals control the motor current in a way where in the area parts B and C according to FIG. 1, as well as where applicable in the area part A, an excess force, whose size is restricted by the control and regulating electronics device 7, is imprinted on the displacement force. The displacement force is required for displacing the setting device 2 and is generally dependent on the location of the lifting path. Without the excess force, to which the excess current or the excess torque of the electric motor 4 corresponds as a difference of curves a and b of FIG. 4, the electric motor 4 would exert on the setting device 2 only just enough force so that the setting device 2 executes a lifting movement over a predeterminable displacement area.

The displacement force selectively takes into account the counter forces appearing over the displacement area or a part of the counter forces. The excess force contains a force reserve to overcome a part of the additional counter forces whose overall amount is restricted.

The excess force can thereby have a different restriction in the different area parts of an overall displacement path. In area part C, for example, the excess force can be restricted to a higher quantity value than in area part B in order to overcome the additional resistance values in the seal area which are dependent on external influences, and to ensure a safe movement of the window pane into the seal area.

The displacement force curve can be determined by computer, empirically or preferably by means of a test run. The test run can thereby be carried out, for example, on the assembly belt prior to installing the vehicle door in a motor vehicle. The test run takes into account individual scatterings of the drive motors as well as of the movable parts of the electrically operated assembly and the resistance forces which occur during a lifting movement.

Figure 4:
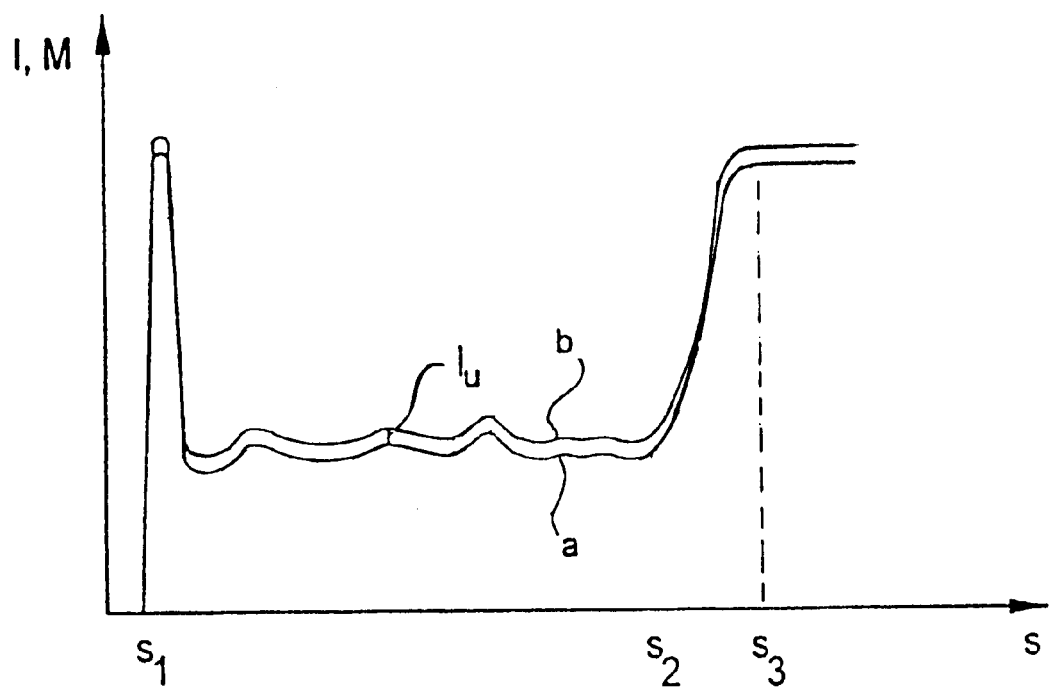
FIG. 4 shows a diagrammatic illustration of the motor current or motor torque versus the displacement path of a window lifter system.

A measuring curve shown diagrammatically in FIG. 4 and which represents the current collected by the displacement motor or the torque delivered above the lifting position, shows with a lifting position s1, the start of the window pane at the lower stop, with a lifting position s2, the beginning of the window entering into the upper window seal, and with a lifting position s3, the stop of the window pane against the upper door frame.

From normal curve a, determined over a window lifter stroke through a standardized run for the current collection of the electric motor, the relevant maximum value of the permissible excess force is fixed by an envelope curve b. The envelope curve is calculated by including various influencing factors as shown in FIG. 4. These influencing factors include the nominal speed of the electric motor, the operating voltage, the preliminary resistance in front of the electric motor, the motor and surrounding temperature, as well as the aforesaid motor characteristic line. This envelope curve restricts the excess force over the entire window lifter stroke or over a predetermined partial area to at least less than 100 Newton.

If the current of the electric motor, during a lifting movement of the window pane, reaches the fixed or calculated maximum value of the current value corresponding to the excess force, then the current is restricted and kept constant. This is achieved, for example, through a corresponding control of the switch device in the case of a pulse width modulation through a constant pulse duration/pulse pause ratio. If during a lifting movement, the window pane is located completely in the upper seal, then independently of whether the current corresponding to the maximum excess force was already reached and restricted in the seal area, the full excess force can be reached on the window pane through delivery of the maximum permissible current according to curve b in FIG. 4.

The method according to the invention allows, in a simple way, the resulting (maximum) excess force during operation of the window lifter to be adapted to heavy going areas (areas of operational difficulty) and/or heavy going (operational difficulties) in the seal inlet. To this end the current is recorded in dependence on the lifting position during each operation of the window lifter system. For example, in the case of a predetermined number of values of the current which correspond to the maximum excess force in the relevant lifting position, the current value corresponding to the normal displacement can be raised. In the same way, for example, friction values, which reduce during operation the amount of excess force dependent on the lifting position, can be adaptively reduced by correspondingly reducing the position-dependent excess current.

Figure 5:
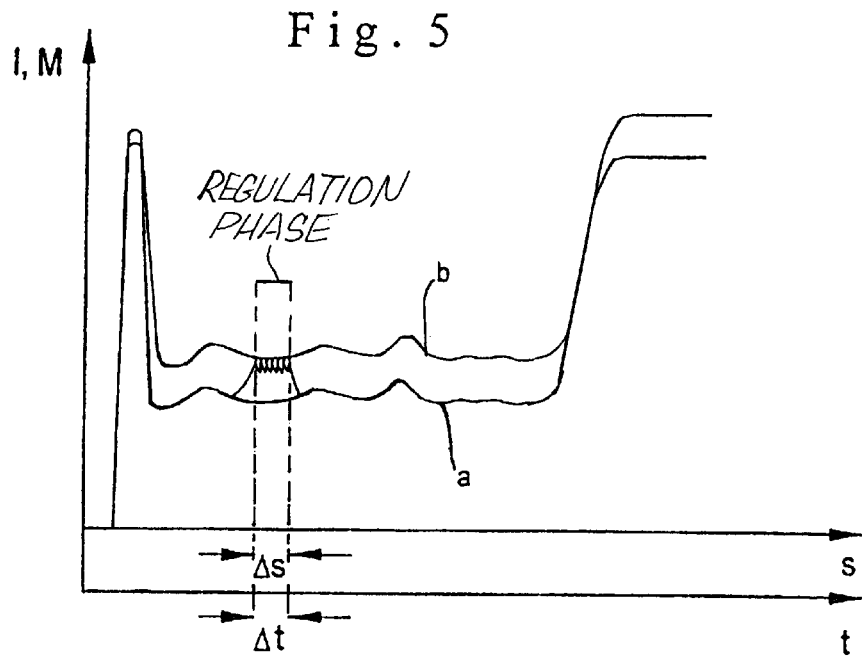
FIG. 5 shows a diagrammatic view of the motor current or motor torque over the displacement path and over the displacement time with the boundary value regulation registered therein.

FIG. 5 shows diagrammatically the path of the motor current or motor torque in dependence on the displacement path s or displacement time t with a boundary value regulation emphasized on a large scale in order that the method according to the invention may be explained and illustrated more clearly. This boundary value regulation takes place over a path section $\Delta s$ over a displacement time interval $\Delta t$. The boundary value regulation can be produced for example through a dynamic influence, such as a pothole, a transverse groove, a slight heavy going in the displacement area or the like. In the predetermined time interval $\Delta t$, which starts when the motor current I reaches for the first time the boundary value predetermined by the envelope curve b and its duration is predetermined as fixed, the motor current is regulated, for example, in pulse width modulation to a constant maximum value predetermined by the envelope curve b. In this boundary value regulating area, in the presence of a temporary dynamic counter moment, the electrically operated assembly is moved with a reduced speed.

At the end of this time interval $\Delta t$, the decision is made by the system whether or not to reverse the closing movement or stop the drive. The decision on a switch-off criterion becoming active up to reversing or stopping the system is made time-delayed, for example, after a length of 200 ms. It can thereby be satisfactorily differentiated whether there is actually a jammed state or a temporary disturbance acting on the system, for example, as a result of traveling over a pothole. In this time interval the motor current is pulsated so that the predetermined maximum value is not exceeded. The electrically operated assembly delivers a constant force of, for example, less than 100 Newtons so that even with the appearance of an actual jammed state, no inadmissible high forces can arise.

With extremely high-speed motors, it is thereby theoretically possible however that the rotation energy stored in the motor armature is so great that the slowing down effect of the motor leads to temporarily exceeding the force limit, for example the 100-N-limit. This rotation energy is like the kinetic energy of the electrically operated assembly, such as a window pane broken down against the earth acceleration, against the friction and through deformation of an obstruction such as, for example, a jammed part of the body, or a force measuring cylinder.

Through a very short counter control over a period of, for example, 5 ms, the motor can be stopped in a defined manner before the boundary value (envelope curve b) is reached. The method described above can then be applied again.

The regulating method shown diagrammatically in FIG. 5 will now be explained in further detail with reference to three different case scenarios.

Figure 6A:
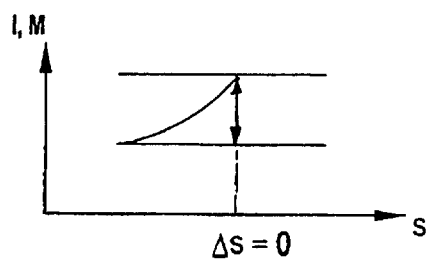
FIG. 6 shows a diagrammatic view of a boundary value regulation in the event of "hard jamming"
Figure 6B:
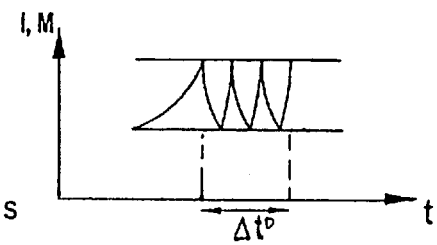

FIGS. 6a and 6b show in a diagrammatic illustration of the motor current or motor torque over the displacement path (FIG. 6a) as well over the displacement time (FIG. 6b) in the case of a "hard jam." A hard-jam is the jamming of an object or part of the body with immediate standstill of the electrically operated assembly. In this case, the path section covered after reaching the predetermined boundary value of the motor current, which corresponds to the maximum value of the excess force, amounts to $\Delta s=0$. The motor current regulation to the predetermined boundary value through pulse width modulation leads to no further displacement of the electrically operated assembly, although the regulation takes place over the time interval $\Delta t^0$. After this time interval $\Delta t^0$ of, for example, 0.5 seconds, the drive device is switched off. Where applicable, the drive device is additionally reversed when the electrically operated assembly is located in the safety area.

Figure 7A:
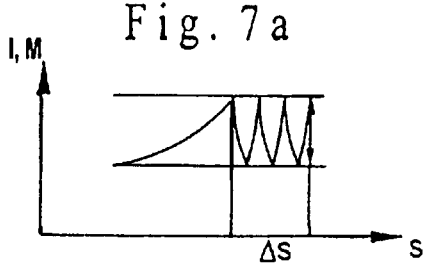
FIG. 7 shows a diagrammatic illustration of the boundary value regulation in the event of "soft jamming" or heavy going in the displacement area.
Figure 7B:
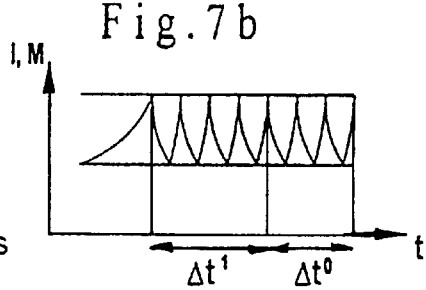

For the case of the "soft jam" or the state of heavy going in the displacement area shown in FIGS. 7a and 7b, a pulse width modulation to the predetermined boundary value is undertaken when the motor current has reached this boundary value which corresponds to the maximum excess force and is predetermined by the envelope curve. This boundary value regulation taking place over a time span $\Delta t^1$ leads to a reduced speed of the electrically operated assembly which covers the displacement section $\Delta s$ in this interval. Only when the electrically operated assembly comes to a complete standstill after the time interval $\Delta t^1$, or its speed drops below a fixed boundary valve, is the switch-off criterion initiated. That is, after the time interval $\Delta t^1$, a boundary value regulation is undertaken over the predetermined time period $\Delta t^0$.

Figure 8:
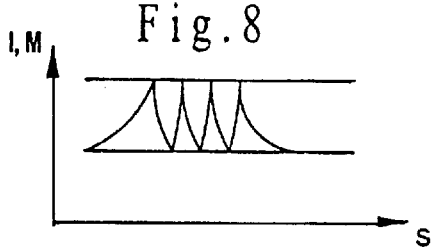
FIG. 8 shows a diagrammatic view of the boundary value regulation in the event of a temporary outside influence and FIG. 9 shows a graph for determining the scanning ratio of a pulse width modulation from the idling speed and the actual speed of an electric motor.

FIG. 8 shows, on an enlarged scale, the case illustrated diagrammatically in FIG. 5 of an outside dynamic influence, such as, for example, what can occur through a pothole, a transverse groove or a slight heavy going in the displacement area.

In this case, during continued displacement of the electrically operated assembly, a pulse width modulation of the motor current is carried out after reaching the predetermined boundary value. The switch-off criterion is not initiated, despite the current reaching the boundary value or the envelope curve representing the maximum excess force, because neither the electrically operated assembly stands still nor does the speed fall below a predetermined boundary speed.

Upon reaching a current value corresponding to the maximum excess force, the current value corresponding to the resulting or maximum excess force is kept substantially constant and after a fixed time span $\Delta t^0$, the drive device is switched off or reversed time-delayed.

If the current value corresponding to the maximum excess force is reached, unlike the known anti-jam protection method it is not assumed here that this is a jammed state. Instead the displacement force or the excess force is preferably restricted according to the measure of an envelope curve. A parameter proportional to the displacement force, such as, for example, the current collected by the drive device of the electrically operated assembly or the torque delivered by the drive device, is regulated upon reaching a predetermined boundary value of the displacement or excess force. In this regulation phase, aparameter correlated with the dynamics of the setting device of the electrically operated assembly, such as the speed or acceleration of the displacement device or assembly, is monitored and, depending on the behavior of the assembly, for example, further closing or lifting movement is continued or there is control and regulating action of the drive device, for example, the drive device is stopped or reversed. Reversing is carried out, for example, in a displacement area wherein the window opening is, for example, more than 4 mm. Reversing the motor can be dispensed with and instead a motor stop with reduced moment can be provided if, for example, the window opening is less than 4 mm or the window pane has reached the area of the lower stop.

Basically it is possible to dispense with reversing if, in particular, it is not possible to differentiate with certainty between a seal inlet and a jammed state, since according to the invention, the clamping force acting on a jammed part of the body or an object is always smaller than the force leading to injury.

Time-delayed reversal, makes it possible to screen out dynamic disturbances which can occur, for example, through temporary negative accelerations on traveling over potholes or through temporary disturbances in the window lifter stroke. During the delay, the switch device is controlled by the control electronics so that the electric motor delivers a constant torque to the setting device, that is the window lifter mechanism.

In many cases, it is expedient to restrict the rise of the motor torque in order, for example, to prevent a hard jam. By restricting the rise of the motor torque, the predetermined resulting excess force of the window lifter rises very slowly. This can be produced, for example, by restricting the current rise (di/dt).

With the solution according to the invention it is possible to meet even the most stringent anti-jam protection conditions with regard to a high rate of error of the measured value recorder (e.g. 65 N/mm). Furthermore, the solution according to the invention ensures a better functioning in the case of a soft stop (before the lower stop) and with a smooth inlet (seal inlet with reduced excess force).

The envelope curve is, for example, adapted or calculated in dependence on the operating voltage, the position of the motor characteristic line in the scatter field, the actual motor speed (motor current), the motor voltage and the motor and surrounding temperature. Furthermore, changes in the displacement forces over the service life are taken into account and the envelope curve is constantly updated.

During operation, the displacement motor gets only so much current that it cannot do more than is predetermined by the envelope curve b. It is thereby possible to dispense with a reversing function in the area of the seal path, since as a result of the restriction on the excess force when a thin object (e.g. a finger) is jammed, acute danger does not arise. Thus it is no longer necessary to differentiate between a jammed case and heavy going of the system.

Figure 9:
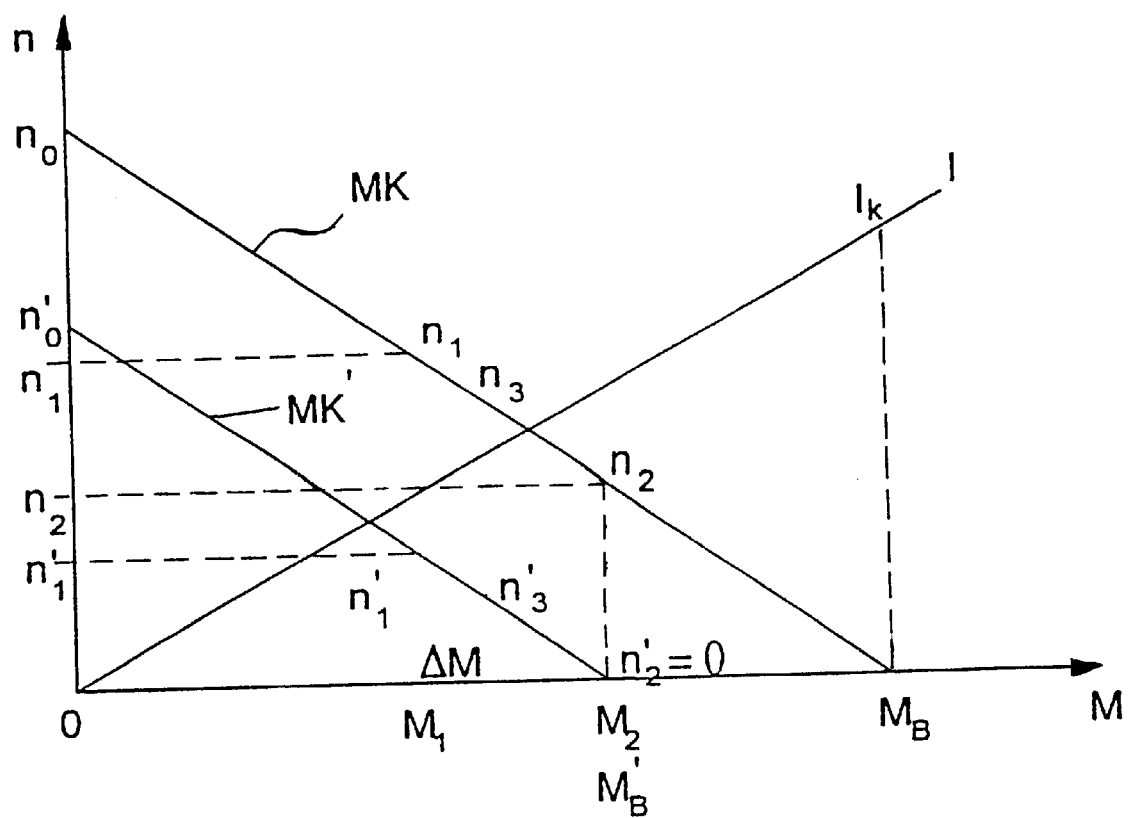

Instead of regulating the scanning ratio of the pulse width modulation, by means of evaluating the motor current by including the motor characteristic line, the ideal values for the pulse width modulation can be calculated from the idling and actual speed of the electric motor by including the motor characteristic line so that no motor current measuring is required which would require extra devices and thus costs. FIG. 9 shows diagrammatically a method of determining the scanning ratio of the pulse width modulation control by displacing the motor characteristic line so that a predetermined excess force is set.

Calculating the pulse width modulation values is only carried out by means of the idling speed and the actual speed of the motor following its motor characteristic line. In FIG. 9 the speed n is entered over the torque M and produces a motor characteristic line MK which is characteristic for the electric motor. The line is sufficient for a straight line equation. The intersection with the ordinate of the co-ordinate system is the idling speed $n_0$, wherein the torque is M=O. The intersection with the abscissa produces the torque $M_B$ wherein the motor speed is n=0. With the rise $A=n_0/M_B$ of the characteristic straight line, the following arises for intermediate values of the speed n:

$$n_{1,2} = n_0 - \frac{n_0}{M_B} * M_{1,2}$$

If the jamming force is restricted to a value which is equal to the torque $M_2$ belonging to the speed $n_2$, then the straight line MK', displaced to the zero point of the co-ordinate system parallel to the straight line MK, is produced whose intersection with the ordinate is the idling speed $n_0'$. Line MK' intersects with the abscissa at the boundary moment $M_B'$ and has a pitch of $A=n_0'/M_B'$. Interposed torque/speed values are produced for $$n'_{1,2} = n'_0 - \frac{n'_o}{M_B} * M_{1,2}$$

When $n_2'=0$, then $$n'_0 = \frac{n'_o}{M'_B}$$

as well as at $$M_2, n_0 = n_2 + \frac{n_0}{M_B} * M_2 = n_2 + A * M_2$$

$$M_2 = \frac{no - n2}{A}$$

$$\frac{n_o}{n'_o} = \frac{n_2 + A * M_2}{A * M_2} = \frac{n_2}{A * M_2} + 1 = \frac{n_2}{n_0 - n_2} + 1$$

As a result of the proportionality between the speed n and the motor voltage U, which is in turn proportional to the scanning ratio of the pulse width modulation, the following arises:

$$\frac{PWM_{alt}}{PWM_{neu}} = \frac{n_0}{n'_o}; PWM_{neu} = \frac{PWM_{alt} * (n_o - n_2)}{n_o}$$

For a speed $n_3$ at the restriction straight lines, thus applies $$n_3' = n_0' - A*(M_1+\Delta M) = n_0 - n_2 - A*(M_1+\Delta M)$$

If the motor is moved further after the voltage reduction, (set excess force) then after a predetermined time of, for example, 200 ms, it is operated again at full power. If the motor remains stationary for this time however, this signifies a jammed state and the polarity of the motor is changed, that is the electrically operated assembly is reversed. The sensitivity to vibrations is improved and the jamming forces are reduced.

Since the motor stops when the matching values are exceeded, the result is irregular running of the electrically operated assembly, in the event of heavy going. In order to prevent this, an adaptive system described above is provided which learns the positions of the heavy going areas and stores them. When running over these areas, the matching forces (envelope curve) are increased and thus the irregularities are compensated.

What is claimed is:

1. A method for electric control and regulation of movement of an electrically operated assembly of a motor vehicle, the assembly having a setting device which is connected to a drive device, and a control and regulating electronics device, the method comprising:

restricting at least in a partial area of a displacement path of the electrically operated assembly, a displacement force of the electrically operated assembly to a predetermined boundary value dependent on the displacement path, regulating a first parameter proportional to the displacement force of the electrically operated assembly, upon reaching the predetermined boundary value, to a first parameter value corresponding approximately to the boundary value;

monitoring a second parameter correlated with a dynamic of the setting device during a regulating phase;

evaluating the second parameter in the control and regulating electronics device;

generating a control and regulating action for the drive device; and delaying at least one of an interruption of current delivered to the drive device and a change of rotary direction of the drive device by a time interval;

wherein the time interval is measured so that a satisfactory differentiation can be made between a lammed state and an external temporary dynamic disturbance.

2. The method according to claim 1 wherein the regulating step includes regulating the first parameter, that is proportional to the displacement force, to the first parameter value corresponding approximately to the predetermined boundary value dependent on the displacement path, wherein the first parameter corresponds to a maximum permissible excess force at a relevant displacement position, wherein the maximum permissible excess force is a force which exceeds a force required for displacing the setting device.

3. The method according to claim 1 or 2 wherein the regulating step includes regulating the first parameter to the first parameter value corresponding approximately to the predetermined boundary value within a predetermined time span until the first parameter falls below the predetermined boundary value.

4. The method according to claim 1 wherein the regulating step includes regulating the first parameter to the first parameter value corresponding approximately to the predetermined boundary value until the setting device or the drive device has come to a standstill.

5. The method according to claim 1 further comprising delivering, through the drive device during the duration of the delay, a constant torque to the setting device.

6. The method according to claim 1 wherein the first parameter corresponds to a current supplied to an electric motor of the drive device.

7. The method according to claim 1 wherein a slope of a current collection of an electric motor is at least one of delayed and restricted.

8. The method according to claim 1 further comprising holding the first parameter constant during the delaying of at least one of the interruption of current delivered to the drive device and the change of rotary direction of the drive device by the time interval.

9. A method for electric control and regulation of movement of an electrically operated assembly of a motor vehicle, the assembly having a setting device which is connected to a drive device, and a control and regulating electronics device, the method comprising:

restricting at least in a partial area of a displacement path of the electrically operated assembly, a displacement force of the electrically operated assembly to a predetermined boundary value dependent on the displacement path, regulating a first parameter proportional to the displacement force of the electrically operated assembly, upon reaching the predetermined boundary value, to a first parameter value corresponding approximately to the boundary value;

monitoring a second parameter correlated with a dynamic of the setting device during a regulating phase;

evaluating the second parameter in the control and regulating electronics device;

generating a control and regulating action for the drive device, wherein the regulating step includes regulating the first parameter to the first parameter value corresponding approximately to the predetermined boundary value within a predetermined time span until the first parameter falls below the predetermined boundary value;

increasing the predetermined boundary value of the parameter by a predetermined amount when the setting device or the drive device is brought to a standstill; and within the predetermined time span, delivering a control impulse by an operating device which causes a closing of the electrically operated assembly.

10. A method for electric control and regulation of movement of an electrically operated assembly of a motor vehicle, the assembly having a setting device which is connected to a drive device, and a control and regulating electronics device, the method comprising:

restricting at least in a partial area of a displacement path of the electrically operated assembly, a displacement force of the electrically operated assembly to a predetermined boundary value dependent on the displacement path, regulating a first parameter proportional to the displacement force of the electrically operated assembly, upon reaching the predetermined boundary value, to a first parameter value corresponding approximately to the boundary value;

monitoring a second parameter correlated with a dynamic of the setting device during a regulating phase;

evaluating the second parameter in the control and regulating electronics device;

generating a control and regulating action for the drive device, wherein the first parameter corresponds to a current supplied to an electric motor of the drive device;

delivering a pulse width modulation of the current to the electric motor at least in a regulating area; and regulating a value of the current to a boundary value dependent on the displacement path and to correspond to the maximum permissible resulting excess force.

11. The method according to claim 9 further comprising predetermining the effective value of the current based on at least one of a motor voltage, a motor speed, a the motor temperatures, and a the surrounding temperature.

12. The method according to claim 9 further comprising reversing poles for a temporary defined braking of the electric motor by reversing the current supplied to the electric motor.

13. The method according to claim 10 wherein one of a maximum peak value, an arithmetic value and a quadratic mean value is regulated to correspond to the maximum permissible resulting excess force.

14. A method for electric control and regulation of movement of an electrically operated assembly of a motor vehicle, the assembly having a setting device which is connected to a drive device, and a control and regulating electronics device, the method comprising:

restricting at least in a partial area of a displacement path of the electrically operated assembly, a displacement force of the electrically operated assembly to a predetermined boundary value dependent on the displacement path, regulating a first parameter proportional to the displacement force of the electrically operated assembly, upon reaching the predetermined boundary value, to a first parameter value corresponding approximately to the boundary value;

monitoring a second Parameter correlated with a dynamic of the setting device during a regulating phase;

evaluating the second parameter in the control and regulating electronics device;

generating a control and regulating action for the drive device, wherein the first parameter corresponds to a current supplied to an electric motor of the drive device;

classifying an electric motor in a test station with regard to at least one characteristic feature; and calculating the predetermined boundary values, that depend on the displacement path and which form the envelope curve restricting the excess force, from the characteristic feature.

15. The method according to claim 14 further comprising adaptively changing a path of the envelope curve by detecting and storing positions of decelerations of the electrically operated assembly.

16. The method according to claim 14 further comprising raising up the envelope curve that restricts the excess force when one of a speed of the electrically operated assembly is not reduced after reaching the predetermined boundary value through the first parameter and the negative acceleration does not exceed a boundary value.

17. The method according to claim 16 wherein the raising up of the envelope curve takes place by a predetermined amount.

18. The method according to claim 16 wherein the raising up of the envelope curve takes place up until the speed of the electrically operated assembly has reached a certain value.

19. The method according to claim 14 wherein the at least one characteristic feature is a slope of a motor characteristic line.

20. The method according to claim 19 further comprising associating the first parameters of the motor characteristic line of the electric motor with displacement positions over the displacement path;

storing the first parameters of the motor characteristic line in the control and regulating electronics device; and calculating the envelope curve restricting the excess force based on these parameters of the motor characteristic line.

21. The method according to claim 19 further comprising adding an amount of a current that corresponds to the maximum resulting excess force to a motor current of the motor characteristic line that corresponds to a relevant motor torque to sum to a resulting maximum value of the current; and restricting the current supplied to the electric motor over the at least one partial area of the displacement path to the resulting maximum value of the current.

22. The method according to claim 19 further comprising calculating a scanning ratio of a pulse width modulation from an idling speed, an actual speed and the motor characteristic line of the electric motor.

* * * * *

UNITED STATES PATENT AND TRADEMARK OFFICE
CERTIFICATE OF CORRECTION

PATENT NO. : 6,236,176 B1
DATED : May 22, 2001
INVENTOR(S) : Jörg Uebelein, Roland Kalb and Jürgen Seegerger It is certified that error appears in the above-identified patent and that said Letters Patent is hereby corrected as shown below:

<u>Title page,</u>
Item [57], ABSTRACT,
Line 4, after "device" insert -- which --.

<u>Column 15,</u>
Line 19, replace "lammed" with -- jammed --.

<u>Column 16,</u>
Lines 53-54, replace "a the motor temperatures, and a the surrounding temperature" with -- a motor temperature, and a surrounding temperature --.

Signed and Sealed this

Eleventh Day of February, 2003

JAMES E. ROGAN
*Director of the United States Patent and Trademark Office*